May 3, 1955 J. E. BAYHA 2,707,356

MACHINE FOR AUTOMATICALLY TESTING AND ADJUSTING THE VALUES OF PRINTED CIRCUIT RESISTORS OR CAPACITORS

Filed May 13, 1953 6 Sheets-Sheet 1

INVENTOR.

Jack E. Bayha

BY Darby & Darby

ATTORNEYS.

INVENTOR.
Jack E. Bayha
BY Darby & Darby
ATTORNEYS.

May 3, 1955 J. E. BAYHA 2,707,356

MACHINE FOR AUTOMATICALLY TESTING AND ADJUSTING THE VALUES OF PRINTED CIRCUIT RESISTORS OR CAPACITORS

Filed May 13, 1953 6 Sheets-Sheet 3

INVENTOR.

Jack E. Bayha

BY Darby & Darby

ATTORNEYS.

INVENTOR.
Jack E. Bayha
BY Darby & Darby
ATTORNEYS.

May 3, 1955 J. E. BAYHA 2,707,356

MACHINE FOR AUTOMATICALLY TESTING AND ADJUSTING THE VALUES OF PRINTED CIRCUIT RESISTORS OR CAPACITORS

Filed May 13, 1953 6 Sheets-Sheet 5

INVENTOR.
Jack E. Bayha

BY Darby & Darby

ATTORNEYS.

May 3, 1955 J. E. BAYHA 2,707,356

MACHINE FOR AUTOMATICALLY TESTING AND ADJUSTING THE VALUES OF PRINTED CIRCUIT RESISTORS OR CAPACITORS

Filed May 13, 1953 6 Sheets-Sheet 6

INVENTOR.
Jack E. Bayha

BY Darby & Darby
ATTORNEYS

United States Patent Office 2,707,356

Patented May 3, 1955

2,707,356

MACHINE FOR AUTOMATICALLY TESTING AND ADJUSTING THE VALUES OF PRINTED CIRCUIT RESISTORS OR CAPACITORS

Jack E. Bayha, South Ozone Park, N. Y., assignor to Emerson Radio and Phonograph Corporation, New York, N. Y., a corporation of New York Application May 13, 1953, Serial No. 354,759

13 Claims. (Cl. 51—8)

At the present time printed circuits are widely used in electrical and electronic apparatus, such circuits being, for example, printed on an insulating base with a conductive ink. Such printed circuits frequently include resistors and capacitors which are likewise printed upon the insulating base with ink which, in the case of resistors, is resistant to the flow of electrical current. The dimensions of the printed area of the resistor are critical in determining the value thereof and since the printing process is not exceptionally accurate the result is that many printed circuits are unuseable because the value of the resistors or capacitors included therein is outside the tolerance limits specified and necessary.

It has become customary to check printed circuits to determine whether the values of the resistor and capacitor elements are within the tolerances required and if not to manually abrade the components to adjust the values to come within the specified tolerance limits.

My present invention relates to a machine which automatically tests printed circuit components such as resistors or capacitors and if the values are not within the tolerance limits desired, abrades the particular component in question until the value is within the specified limits. Obviously, since some printed circuits will have the components within the specified limits before being placed in my automatic machine the machine is provided with means to test the components and to pass them immediately if the values are correct. Also, since it is impractical to adjust both those components whose value is outside the tolerance limits on the low and those which are outside the tolerance limits on the high side, the machine is arranged to immediately reject one of the two classes above-mentioned and to accept and adjust the other of the two classes.

While the above has mentioned the utilization of my mechanism for adjusting the value of both resistors and capacitors, the embodiment chosen for illustration is arranged to adjust resistor values only, it being understood that capacitors would be adjusted in a substantially identical manner, the resistance type bridge which is used for measurements in the case of resistors being substituted for by a capacitance bridge in the event capacitors are to be tested and adjusted.

It is an object of my invention to provide a machine which will test printed circuit resistors and capacitors, determine whether the values of such tested resistors and capacitors are within specified tolerance limits and, if outside the tolerance limits, determine whether the particular unit can be adjusted to fall within the limits.

It is another object of my invention to abrade those units which are capable of being adjusted to come within the limits while testing the unit so that the abrasion is stopped when the value lies within the specified tolerance limits.

It is a further object of the invention to provide a machine as described having a plurality of stages whereby a printed circuit having a number of resistors can be processed by the machine so that the resistors are tested and adjusted one after the other passing through a number of stages equivalent to the number of resistors and capacitors to be tested and adjusted.

It is a further object of the invention to provide a machine as described so arranged that certain contact fingers which are used to test a particular resistor may be exchanged for fingers adapted to test another resistance and likewise so arranged that the changing of the contact fingers compels a corresponding change of the test standards and the positioning and arrangement of the abrading nozzle or its equivalent.

Other objects and features of the invention will be apparent when the following description is considered in connection with the annexed drawings, in which, Figure 1 is a front elevation of a testing and abrading machine in accordance with my invention. This view shows a complete mechanism at the center thereof and shows, additionally, parts of identical mechanisms which may form preceding and succeeding stages in the testing and adjusting of a complete printed circuit;

*Chassis*

Figure 8:
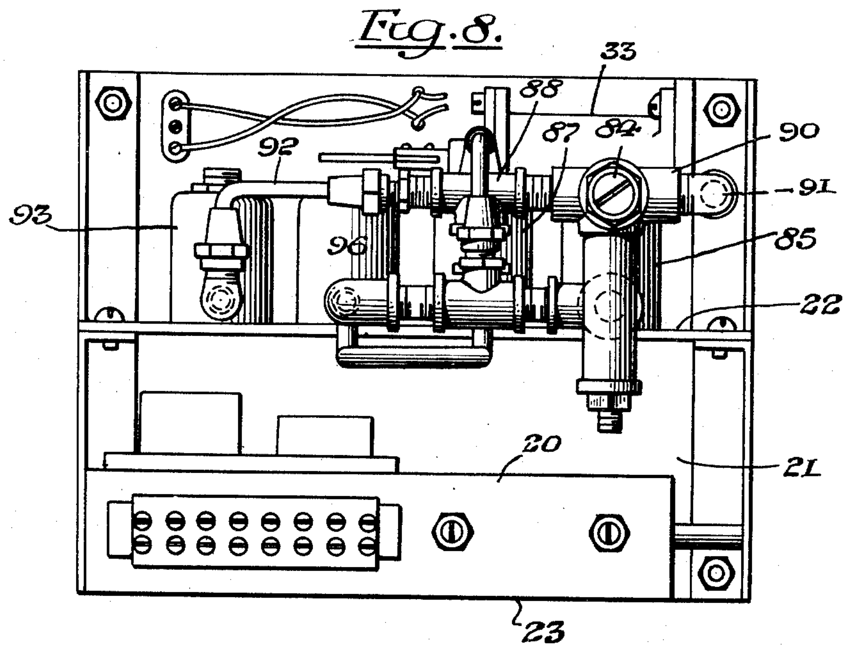
Figure 8 is a rear elevational view of the machine of Figure 1.

Referring now to the drawings, it will be seen that the various mechanisms are mounted upon a chassis which comprises a base 20 and a vertically extending front panel 21. The chassis also includes an auxiliary base plate 22 on which certain of the component parts, particularly parts of the pneumatic system, are mounted. In a manner common in radio circuits many of the electrical components of the device are mounted on the lower side of the base panel 20 and certain of the components are mounted on the depending flange 23 of the base 20 (see Figure 8).

*Feeding mechanism*

The printed circuit units or cards 24 (see Figure 10 which shows one side of a typical card), are stacked in a hopper generally designated 25 which hopper is fastened in any suitable manner to the vertical panel 21. Beneath the hopper 25 and spaced therefrom the thickness of one of the cards 24 is a stationary hopper bottom plate 26 which extends horizontally and thence curves and extends vertically downward.

Figure 3:
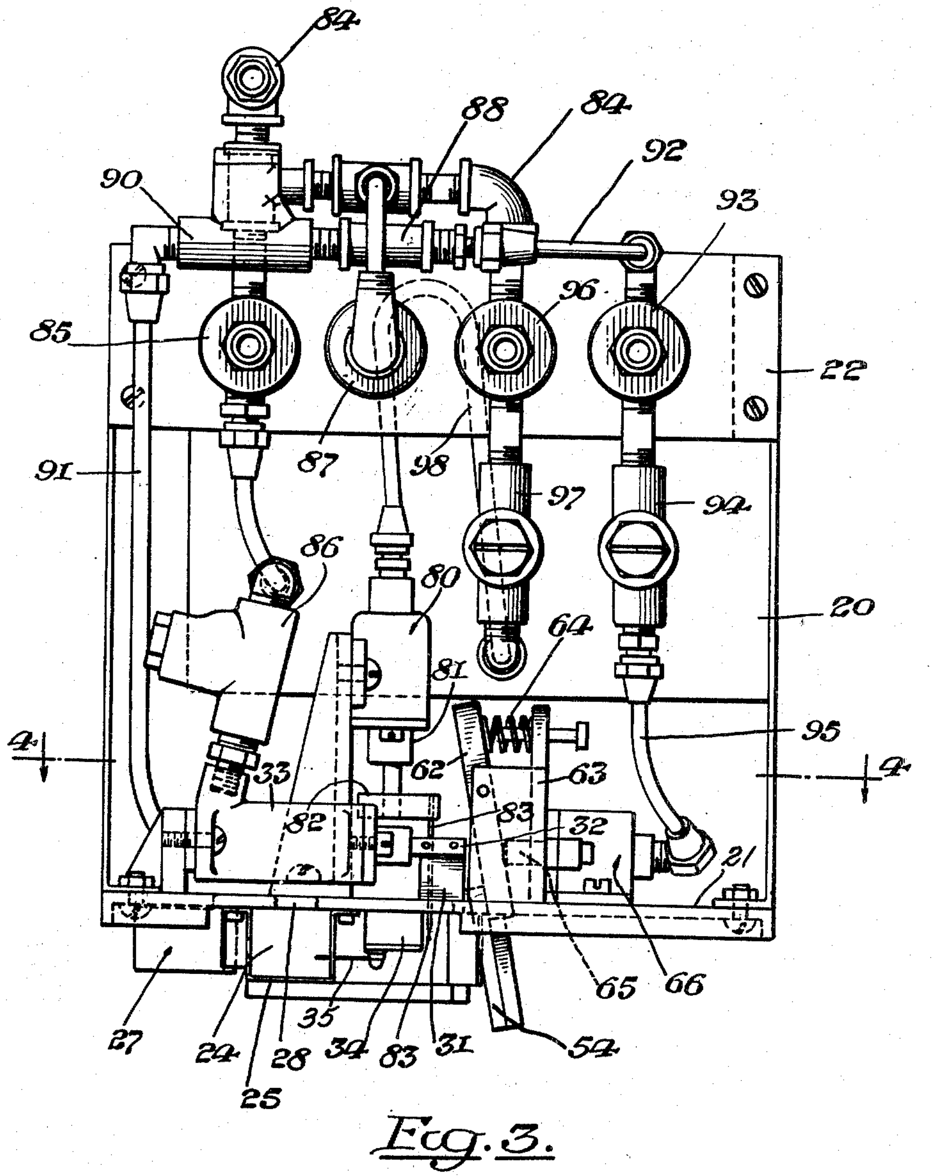
Figure 3 is a top plan view of the machine of my invention.
Figure 4:
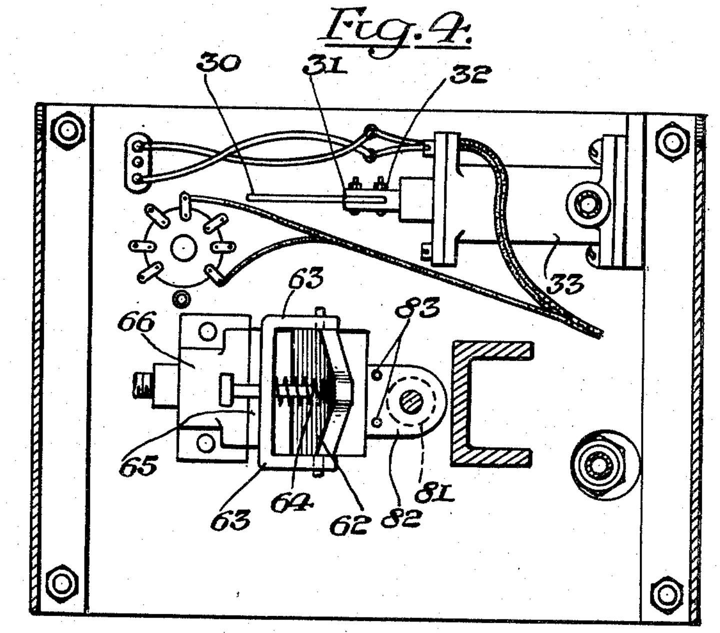
Figure 4 is a cross-sectional view of the automatic testing and abrading machine of my invention, the view being taken on the line 4—4 of Figure 3.
Figure 5:
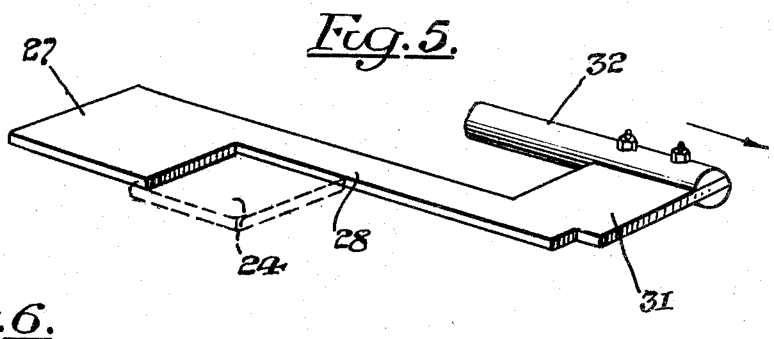
Figure 5 is a fragmentary perspective view of the slide which feeds printed circuits from a supply hopper to the machine.

Slidably mounted for reciprocatory movement across the bottom plate of the hopper is a feed slide 27 which slide is best seen in Figure 5. This feed slide is provided with an extension 28 which operates in a slot 30 in the panel 21, the slide being connected at its right hand end by means of a rearwardly extending portion 31 to the piston rod 32 of an air cylinder 33 (Fig. 3). Thus each time that air is admitted to the cylinder 33, as will later be described, the feed slide 27 reciprocates from left to right and returns, the piston of the air cylinder 33 being spring-biased to the left. As the slide moves to the right the printed circuit card 24 lying upon the base 26 is moved across that base and falls under gravity along the downwardly sloping portion of the plate 26.

Mounted adjacent the right hand edge of the hopper 25 is a sensitive switch 34, the contact controlling member 35 of which extends into a slot 36 in the wall of hopper 25. Member 35 lies along the edges of the cards 24 and extends downwardly to the level of the second card in the stack with the result that when but one card remains in the stack the operating member 35 is permitted to rise, that is, to rotate in a clockwise direction about its pivot point, thus opening the switch contacts, this serving to stop the machine when the hopper is empty except for one card, the operation of the circuits affecting this result being hereinafter described.

As has been described, the bottom 26 of the hopper 25 curves downwardly and terminates in a vertical portion 37. Cooperating with the member 26 is a chute wall 38, portion 40 of which extends parallel to the portion 37 of member 26 forming a chute 41, the width of which is substantially equal to the thickness of a card 24. Cards descending into the chute 41 formed as described above are confined in a lateral direction by means of the panel 21 and a plastic face plate 42 fixed to the panel 21 by means of supporting members such as 43. It should be noticed at this time that the member 43 also serves to support the chute wall 38.

Extending between the portions 37 and 40 of the chute members 26 and 38 respectively is a pin 44 from which depends an arm 45 which is spring-pressed toward the rear by means of a small spring (not shown) coiled about the pin 44, arm 45 thus serving to hold cards in the chute 41 against the panel 21 so that the cards are definitely positioned during the time when the sensing operation, later described, occurs.

Cards descending in the chute 41 are positioned vertically by means of two pins 46 which pins extend through notches 47 in the lower edge of the portion 37 of the chute wall 26 and into the chute 41 where they arrest a card falling through the chute.

Mounted on the panel 21 to the left of the chute 41 is a sensitive switch 48 having a finger 50 which extends into the chute 41. So long as there is no card in the chute 41 the switch 48 has its contacts open and the machine cannot operate. Upon the arrival of a card in the chute the contacts of switch 48 are closed and the machine caused to go through a cycle of testing or of testing and adjusting operation. Also mounted on the panel 21 near the bottom thereof is a sensitive switch 49 the contact finger of which extends into the hopper 25 of another machine of the series. The contacts operated by this finger are normally closed, but if the stack of cards 25 in the hopper of the succeeding stage reaches a predetermined level the contacts are opened causing the stage considered to stop permitting the following stage to continue operation and the preceding stage to again commence operation when the stack in the hopper has been reduced.

*Sensing mechanism*

Figure 1:
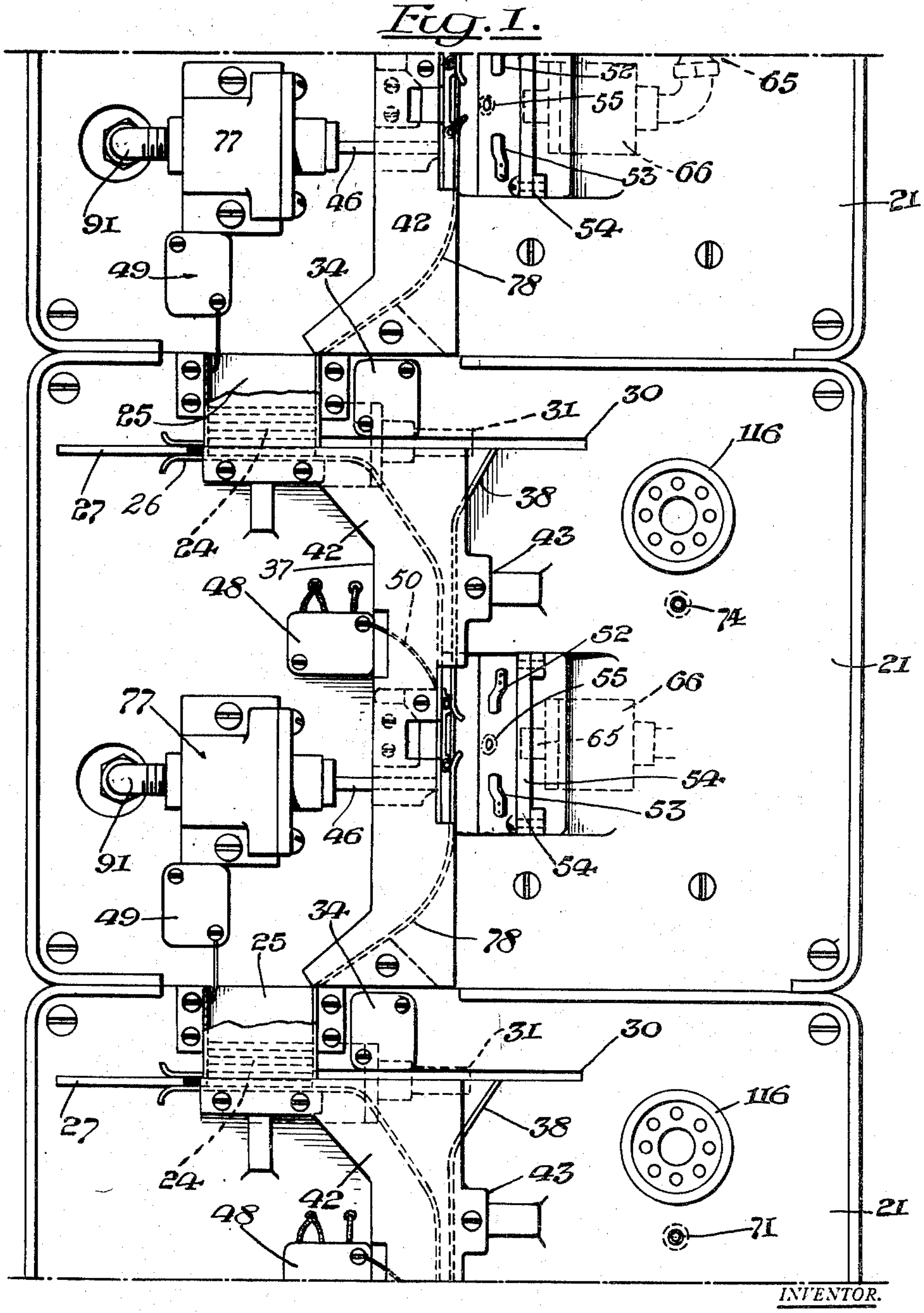
Figure 2:
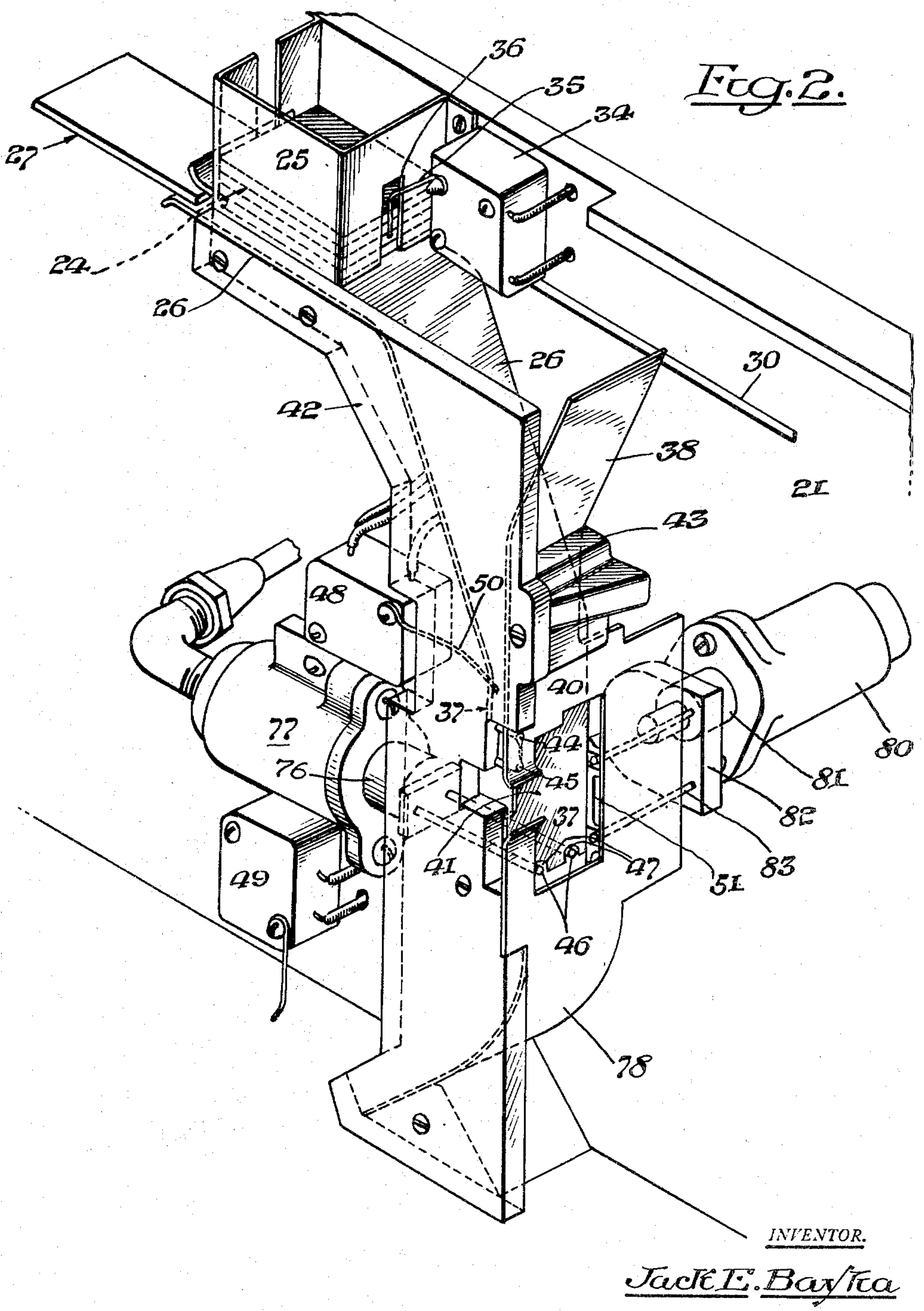
Figure 2 is a fragmentary perspective view of the machine showing particularly the feed mechanism, the sensing mechanism and the mechanism for segregating those printed circuits which are correct in value from those which are incorrect and for ejecting the latter.
Figures 6, 7:
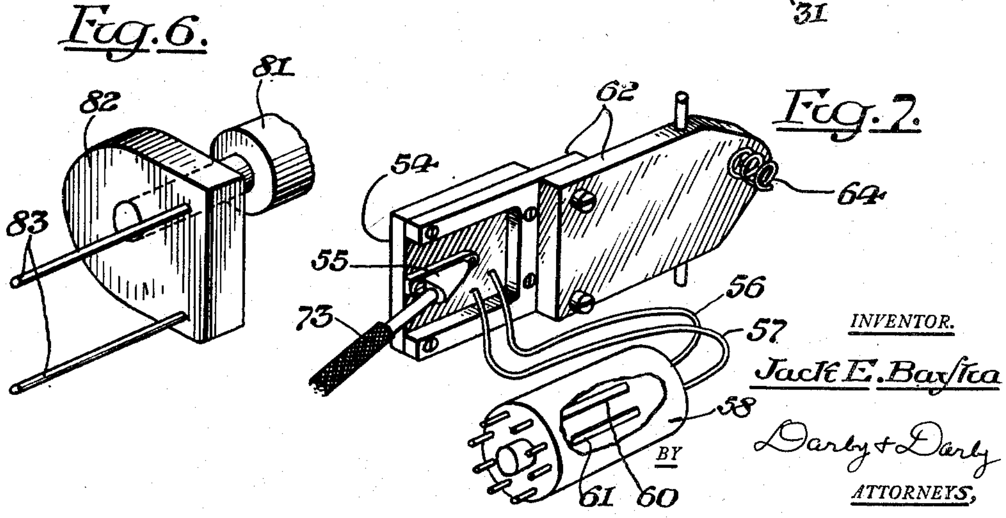
Figure 6 is a fragmentary perspective view of that portion of the mechanism which serves to eject printed circuits having resistors incapable of adjustment from the machine.
Figure 7 is a perspective view of the mechanism for sensing the value of a resistor and abrading it to a new value. This view also shows the plug-in arrangement for changing the test standards simultaneously with a change in the value of resistors to be tested and of the abrading means utilized.

As is best seen in Figure 2, the wall portion 40 of the chute 41 is cut out as indicated at 51 to provide access for sensing fingers or contacts which rest against the end connections to a resistor on the printed circuit card and make it possible to determine whether the resistance thereof is within the tolerance limits desired. These sensing fingers designated 52, 53 are best seen in Figure 1 in which they are shown in the position which they occupy when not performing the sensing function. The fingers 52, 53 are mounted upon an insulating plate 54 which plate also carries a nozzle 55′ mounted in a block 55 in turn mounted on the rear surface of the plate 54. The sensing fingers 52 and 53 are connected by means of the leads 56 and 57 to a plug-in unit 58 (Fig. 7) which unit contains resistors 60 and 61 forming an adjustable arm of a resistance bridge such for example as a Wheatstone bridge which will be described hereinafter.

Plate 54 is mounted on the left hand surface of forked arm 62 which arm is pivotally mounted in a bracket 63 fixed to the rear surface of the panel 21. Arm 62 is normally held in the position shown in Figure 3 by means of a coil spring 64 extending between a portion of the bracket 63 and the rear of the arm 62. Bearing against the portion of arm 62 forward of its pivot point is the piston rod 65 of an air cylinder 66.

It will be seen therefore that when air is admitted to the cylinder 66 the arm 62 moves in a clockwise direction about its pivot as seen in Figure 3 causing the fingers 52 and 53 to protrude through the opening 51 in the chute wall 40 and bear against the connections to the particular resistor to be tested. For example, in the printed circuit shown in Figure 10 it may be desirable to test the resistor 67. The contact fingers 52 and 53 will, in this case, rest at points such as 68 and 70. The resistor 67 will form one arm of a bridge a second arm being formed by resistors 60 and 61 and the remaining two arms being formed by fixed resistors mounted on the chassis, these resistors being seen only in Figure 11 and being there designated 71 and 72.

*Abrading mechanism*

The nozzle 55 is connected by means of flexible tubing 73 (see Figure 7) to a fitting 74 mounted on the panel 21. This fitting is connected by means of suitable piping to a sandblast unit (not shown) which unit may, for example, be that sold by the S. S. White Company and known as the "Airbrasive" miniature sandblaster. This unit includes a solenoid valve 75. The unit and its valve are shown only in Figure 9.

*Pass mechanism*

As has been stated hereinabove cards descending in the chute 41 are stopped and caused to assume a particular position by means of two pins 46 which extend across the chute. These pins 46 are mounted upon the piston rod 76 of an air cylinder 77. Thus whenever the air cylinder has the supply thereto cut off the piston rod is moved to the left under spring-tension and the pins 46 move out of the path of the card permitting the card to drop and to be guided by the lower bend 78 of the chute wall 38. Thus circuit cards on which the value of the particular resistor tested lies within the specified tolerance range are permitted to drop and to either pass on to a succeeding stage for testing and adjusting of another resistor or exit from the machine.

*Reject mechanism*

Mounted on the rear of the panel 21 is a reject air cylinder 80, the piston rod 81 (Fig. 6) of which carries a block 82 on which are mounted two pins 83. Pins 83 extend through the panel 21 and lie centrally of the chute 41, that is, lie between the chute wall portions 37 and 40 being vertically in alignment one with another and located vertically of the panel so that they are directly behind a printed circuit card in its test position, that is, resting upon the pins 46. Thus when the air cylinder 80 is supplied with air it causes a printed circuit card lying in the sensing or test position to be pushed forwardly while resting on the pins 46 and thus to be ejected out of the chute in a forward direction and preferably into a box supplied for such rejects.

*Pneumatic connections*

Figures 9, 10:
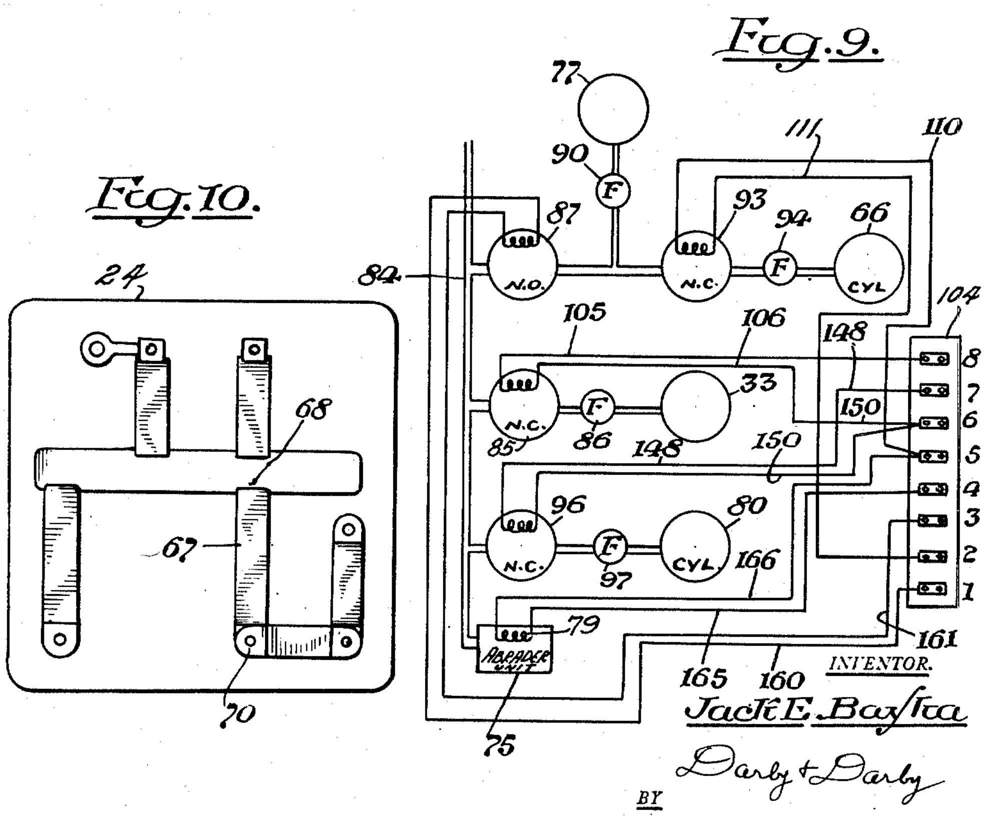
Figure 9 is a schematic piping diagram showing the mode of interconnecting various pneumatically operated components of the machine.
Figure 10 is a plan view of a typical printed circuit such as would have the resistor components adjusted and tested by the machine of the instant invention.

The four air cylinders 33, 66, 77 and 80 previously mentioned are connected to a source of air having a regulated pressure. Referring now to Figures 3 and 9, the air supply to the various cylinders is by means of the supply pipe 84. From the pipe 84 air is supplied to the solenoid valve 85 and thence to a flow control valve 86 and to the feed cylinder 33. In a similar manner air is supplied from pipe 84 through appropriate couplings to a solenoid valve 87 and, when the valve 87 is opened through a coupling 88 and a flow control valve 90 and pipe 91, to the pass cylinder 77. It will be noted that coupling 88 is also connected by means of the pipe 92 to the solenoid valve 93 so that only when air is admitted to the coupling 88 through the solenoid valve 87 can the solenoid 93 be effectively energized. Solenoid 93 is connected through the flow valve 94 and the pipe 95 to the sensing cylinder 66.

The main supply pipe 84 is also directly connected to the solenoid valve 96 and the flow control valve 97 and pipe 98 to the reject cylinder 80. As will appear hereinafter when the electrical circuit is described, the various solenoid valves 85, 87, 93 and 96 are operated at such times as to control the operation of their associated air cylinders and thereby time the operation of the mechanisms in a coordinated manner so that cards will be tested, passed, adjusted or rejected as may be proper. The use of a pneumatic system with solenoid valves and flow control valves makes possible an accurate adjustment of the speed of operation of the various mechanisms as well as the timing of the initiation of such operations. This is to be contrasted with the use of solenoids to affect the movements directly which, although possible, is less practical since it is difficult to adjust the speed of movement of the solenoids.

*Electrical circuit and machine operation*

Figure 11:
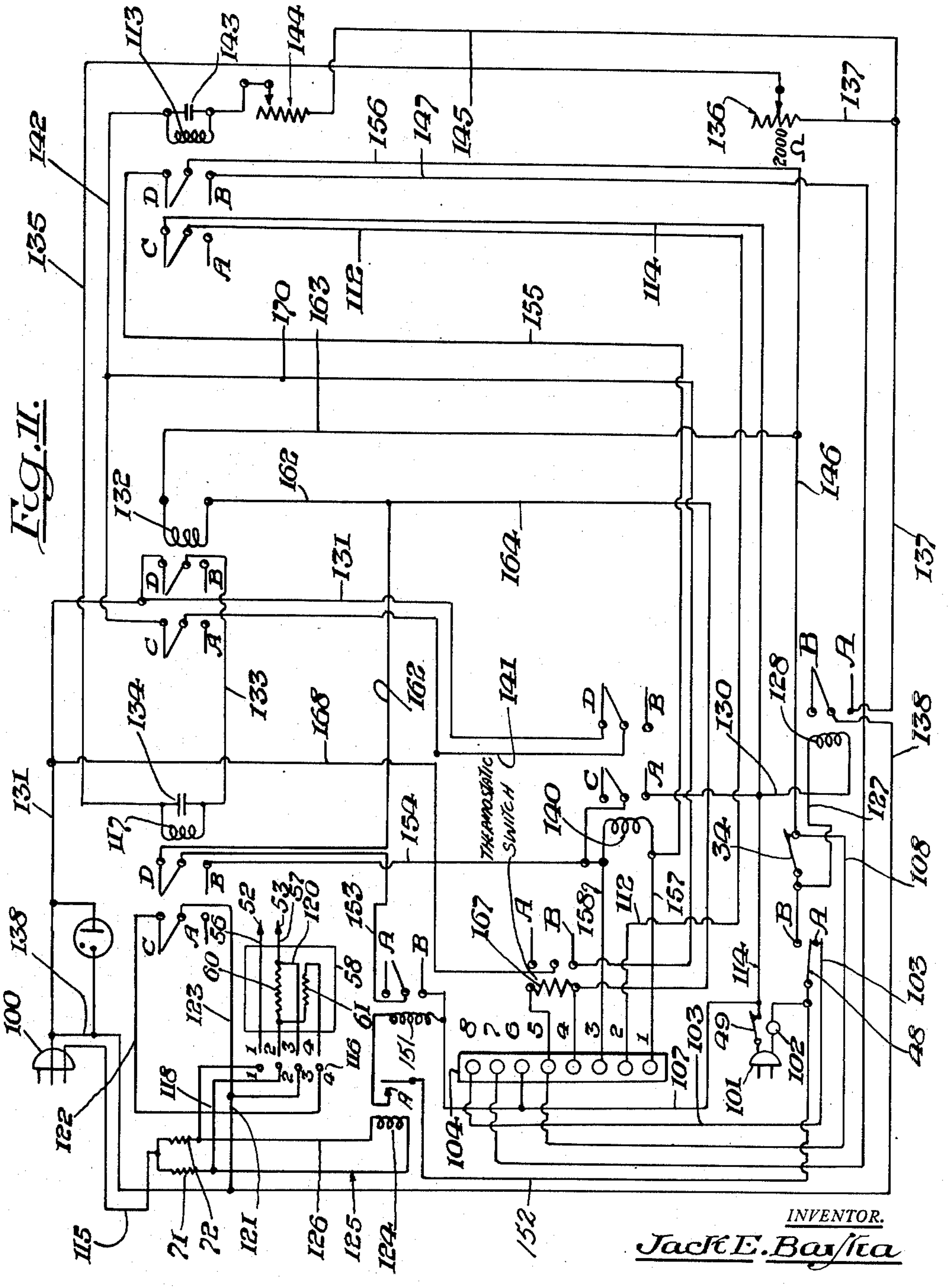
Figure 11 is a schematic electrical wiring diagram of the machine.

The coordinated operation of the various parts heretofore described, as well as the testing of the printed circuit resistors is effected through the use of electrical control circuits which circuits are shown in schematic form in Figure 11. The circuits will be traced in connection with the operation of the machine and for this purpose it will be assumed that cards are placed in the hopper 25, the two power plugs shown at 100 and 101 in Figure 11 inserted in a socket and the toggle switch 102 operated. It is to be noted that plug 100 is inserted in an outlet receptacle for direct current while plug 101 is placed in an outlet receptacle for alternating current.

Upon closure of switch 102, as mentioned, a circuit is completed through plug 101, switch 102, conductor 103, to terminal 8 of the terminal strip 104 (this strip being shown in Figures 9 and 11), thence over the conductor 105, through the winding of solenoid valve 85 over conductor 106 to terminal member 6 of terminal strip 104, thence over conductor 107 and switch 49 to the opposite side of the A. C. line. Solenoid valve 85 is operated, air is admitted to the cylinder 33 and the slide 27 therefore moves to the right causing a printed circuit card to be fed into the chute 41 and to come to rest on the pins 46 the card being held rearwardly against the panel 21 by means of the spring-pressed gate 45.

As the card comes to rest in the position stated, the sensitive switch 48 is operated by the card striking the finger 50, contacts A of that switch being opened and contacts B closed. As a result of this operation the solenoid for valve 85 is deenergized, its valve closed, and the feed slide 27 returned to its normal lefthand position due to the spring-loading of the piston thereof.

Also, as a result of the closure of contacts B of switch 48 (Fig. 11) a circuit is completed from one side of the A. C. source through the switch 102, switch contacts 48B, switch 34, conductor 108, to terminal 5 of the strip 104, thence over conductor 110, through the winding of solenoid valve 93, over conductor 111 to terminal 2 of terminal strip 104, thence over conductor 112, through closed contacts C of D. C. relay 113, conductor 114 and switch 49 to the other side of the A. C. line. Normally closed solenoid valve 93 is thus opened and air flows through the flow control valve 94 to the sensing plate cylinder 66 which then causes the sensing arm 62 to pivot about its pivot point and bring the contact fingers 52 and 53 into contact with the assumed points 68 and 70 on the typical printed circuit card of Figure 10.

The operation of switch 48 also causes completion of a circuit from the A. C. source through switch 102, contacts 48B, conductor 127, winding of relay 128, conductor 130, conductor 114, switch 49 to the other side of the A. C. line. This results in operation of relay 128 to close its A contacts and completes a circuit from the positive side of the D. C. source at plug 100 over conductors 131, through contacts D of relay 132, over conductor 133 to the winding of relay 117 (which has in parallel therewith a capacitor 134) and thence over conductor 135, potentiometer 136, conductor 137, contacts A of relay 128, and conductor 138 to the negative side of the D. C. source at plug 100.

We will first assume that the resistor 67 under test has a value outside the tolerance range and that this value is higher than the upper limit of that range. This resistor therefore should be rejected since the sandblasting operation can only increase the resistance value and never decrease it.

As soon as sensing fingers 52 and 53 come into contact with the printed circuit the resistor under test is connected as one arm of a Wheatstone bridge. This Wheatstone bridge comprises fixed resistors 71 and 72 as two of the arms thereof, these resistors being joined and connected by means of conductor 115 to the positive terminal of the plug 100. The third arm of the bridge is composed of the high standard resistor 60 and, initially, the low standard resistor 61 in parallel with the high standard. As has been indicated, the standards 60 and 61 are housed in the enclosure 58 and are directly connected to the terminal pins of a plug which fits the socket 116 mounted on the panel 21. Although the socket 116 is shown in Figure 1 as having eight prong receiving openings only four of these are used and for this reason the prongs and the prong openings have been designated 1, 2, 3 and 4 in the schematic wiring diagram of Figure 11.

The sensing fingers 52 and 53 make contact with the resistor on the printed circuit card and connect it in as the fourth arm of the Wheatstone bridge. Initially contacts C of relay 117 are closed and therefore the third arm of the bridge comprises the two resistors 60 and 61 in parallel. This circuit may be traced from the lower end of resistor 71 through conductor 118, terminal 2 of socket 116, terminal 2 of plug 58, resistor 60, conductor 120, terminals 3 of the plug and socket 116 and conductors 121 and 138 to the negative terminal of the source at plug 100. A parallel circuit is simultaneously extended from resistor 60 through resistor 61, terminal 4 of the plug and socket 116, conductor 122, contacts C of relay 117 and conductor 123 to conductors 121 and 138 and to the negative side of the source. The value of the printed circuit card resistor is now compared with the value of resistors 60 and 61 in parallel. Since it was assumed that the printed circuit resistor had a value outside of the desired range it is obvious that its value will be higher than that of the low standard formed by the parallel connection of resistors 60 and 61.

A bridge relay 124 of the meter relay type is connected across the bridge by means of conductors 125 and 126. This relay is arranged to close its contacts only when the printed circuit resistor has a value lower than the value of resistors 60 and 61 in parallel. Consequently the relay will not close at this time.

As has been explained above, the circuit to relay 117 is completed at the time when the relay 128 is energized. However, due to the time delay embodied in the capacitor 134 and potentiometer 136, relay 117 does not operate until sufficient time has elapsed to enable the bridge relay 124 to operate. After this interval of time has elapsed relay 117 operates and the movement of its armature away from contact C onto open contact A breaks the parallel circuit through low standard resistor 61 thereby enabling the bridge to effect a comparison between the printed circuit resistor and the resistor 60 which is the high standard resistor.

At the time when relay 128 was operated another circuit was also completed, this circuit extending from the positive terminal of the D. C. source at plug 100, over conductor 131, through contacts D of relay 140, conductor 141, contacts C of relay 132, conductor 142, winding of relay 113 shunted by condenser 143, potentiometer 144, conductor 145, conductor 137 and thence over a circuit previously traced to the negative terminal of the D. C. source.

The capacitor 143 and potentiometer 144 comprise a time delay circuit, and delay operation of relay 113 for a time sufficient to enable the comparison of the printed circuit resistor with the high standard resistor 60. Since it has been assumed that the printed circuit resistor has a value higher than the high standard resistor 60 the bridge relay 124 will not operate.

Consequently, the operation of relay 113 now completes a circuit from one side of the A. C. source through switch 102, contacts 48B of switch 48, contacts of switch 34, conductor 146, contacts B of relay 113, conductor 147 to terminal 7 of the terminal strip 104, thence over conductor 148 to the reject solenoid valve 96, then over conductor 150 to terminal 6 of the terminal strip 104 and thence over conductor 107 and switch 49 to the opposite terminal of the A. C. source at plug 101. Solenoid valve 96 operates and air therefore flows into the reject cylinder 80 which causes the piston rod thereof to move forwardly and the pins 83 to press against the rearmost edge of the printed circuit card in the chute 41 ejecting it forwardly and out of the chute.

Ejection of the card results in opening contacts B of switch 48 and closure of contacts A thereof. All relays now restore to the position shown in Figure 11. The circuit is completed to the solenoid valve 85 and in the manner previously described another printed circuit card is fed from the hopper 25 into the chute 41.

Let us assume that the card now fed has a value of resistor 67 which lies between the upper and the lower tolerance limits, that is, between the value of resistor 60 alone and the value of resistors 60 and 61 in parallel. The operation in this case will result in the sensing fingers being applied to the terminals of the circuit resistor under test in the same manner as described hereinabove and in first comparing that resistor with the value of the resistors 60 and 61 connected in parallel. Since under the assumed conditions the value of the printed circuit resistor is greater than the value of the parallel combination of resistors 60 and 61 the bridge relay 124 will not operate and relay 117 will operate after a time delay as heretofore described. The operation of relay 117 will remove resistor 61 from its shunting connection around resistor 60 and the printed circuit resistor will be compared with the resistor 60 alone.

Since the value of the printed circuit resistor 67 is lower than that of resistor 60 the bridge relay 124 will now operate completing a circuit which extends from one side of the A. C. source over conductor 107, through winding of relay 151, contacts A of bridge relay 124 and over conductor 152 to switch 102 and the other side of the A. C. source at plug 101. (It will be noted that relay 113 has not operated at this time due to the greater time delay supplied in this circuit). Operation of relay 151 will complete a circuit extending from one side of the A. C. source over conductor 107, contacts B of relay 151, conductor 153, contacts B of relay 117 (which has now operated as explained), conductor 154, winding of relay 140, conductor 155, contacts D of as yet unoperated relay 113, conductor 156 to conductor 146 and thence over switch 34, contacts B of switch 48, switch 102 to the opposite terminal of the A. C. source at plug 101.

Terminals 1 and 3 of the terminal strip 104 are connected by means of conductors 157 and 158 respectively across the winding of relay 140 and consequently the completion of the circuit through the winding 140 also completes a parallel circuit through terminal 1 of the terminal strip 104, conductor 160, winding of solenoid valve 87, conductor 161 to terminal 3 of the strip 104. Energization of relay 140 breaks the circuit through its contacts D and contacts C of relay 132 to the relay 113 and thus prevents this relay from closing its contacts A and B. That is, the circuit to the relay winding is opened before the relay has operated due to the time delay characteristics of its circuit.

Energization of solenoid 87 cuts off air from the flow valve 90 and cylinder 77, the spring loaded piston rod 76 of which then moves to the left as seen in Figure 1 and permits the card to fall and to be directed by the curve 78 in the chute wall 38 into the hopper 25 of the next stage.

Also the energization of solenoid valve 87 cuts off air from the valve 93 and cylinder 66 and raises the contact plate to move to open position, removing the contact fingers 52 and 53 from the chute 41.

As a result of the action above described, the B contacts of switch 48 again close resulting in the restoration of all circuits to the former position shown on Figure 11 and resulting also in another energization and feeding action of the feed slide 27 feeding a new printed circuit card 24 into the chute 41.

It is assumed that the particular resistor 67 being tested at this time has a value lower than the low tolerance limit, that is, that the resistor value is less than the value of resistors 60 and 61 in shunt connection. The contact solenoid valve 93 and its associated cylinder 66 will operate in the manner previously described to place the sensing fingers on the printed card resistor terminals. As described heretofore relay 128 will operate to complete circuits to relays 113 and 117 but these relays will not operate due to the time delays embodied in their circuits as above described.

Since the value of the printed circuit resistor is lower than the value of the shunt combination of resistors 60 and 61 bridge relay 124 will operate, this at a time when neither of the relays 113 and 117 has yet operated. Consequently relay 151 will operate and a circuit will be completed from plug 101 through switch 49, conductor 107, contacts B of relay 151, conductor 153, contacts D of relay 117, conductor 162, relay 132, conductor 163, conductor 146, switch 34, contacts B of switch 48, switch 102 to the other terminal of the A. C. source at plug 101. Operation of relay 132 and consequent opening of its contacts C and D opens the circuits to the windings of relays 113 and 117 thereby preventing operation thereof.

At the same time that relay 132 operated a parallel circuit was completed from conductor 162 over conductor 164 to terminal 4 of terminal strip 104 and thence over conductor 165 to the control solenoid 79 of the abrader 75, over conductor 166 to terminal 5 of the strip 104, thence over conductor 108, switch 34, contacts B of switch 48 and switch 102 to the other side of the A. C. source at plug 101. As a result of this action abrasive material flows through the nozzle in block 55 and abrades the printed circuit resistor.

This action continues until the resistance value of the printed circuit resistor becomes greater than the value of resistor 60 shunted by resistor 61. When this occurs the bridge relay 124 deenergizes breaking the circuit to relay 151 which then also deenergizes breaking the circuit to relay 132 as well as the circuit to the abrader valve 75. Deenergization of relay 132 again completes the time delay circuits to relays 113 and 117. After the predetermined time, delay relay 117 operates and opening of its contacts C removes the shunted resistor 61 from the bridge circuit permitting comparison of the resistance value of the printed circuit resistor with the high standard 60.

Since the value of the resistor is less than that of the high standard 60 the bridge relay 124 does not operate and after a short additional period of time relay 113 pulls up completing a circuit previously described over contacts D of relay 113 to relay 140. Relay 140 then energizes in a manner already described, the solenoid valve 87 being energized simultaneously therewith. Air cylinder 77 operates to remove the pins 46 from beneath the card and permit it to pass down the chute to the hopper of the next lower stage. Had the printed circuit resistor after abrasion had too high a value the relay 113 would have become energized at a time when the bridge relay 124 remained operated and therefore the particular card, instead of being passed by the pins 46, would have been ejected by the pins 83. Operation of solenoid valve 87 cuts off air to contact cylinder 66 and spring 64 then removes the sensing fingers from chute 41.

In order to prevent the abrader from operating for an excessive time period a thermostatic switch 167 is supplied. The heater coil of this switch is connected directly across terminals 4 and 5 of the terminal strip 104 or in other words directly across the solenoid valve 75 of the S. S. White "Airbrasive" device. Thus if current flows for too great a period through the control valve of that device, a circuit is completed from conductor 131 over conductor 168, contacts B of thermostatic switch 167, conductor 170 and conductor 142 to relay 113 which is then actuated and causes, by virtue of its closure of contacts B, completion of a circuit heretofore traced to operate the reject solenoid valve 96.

If a number of the machines heretofore described are connected in a cascade arrangement as has been suggested and the following stage is running at a lower rate than the stage in question, the result will obviously be that the feed hopper 25 of the following stage will become filled. This filling of the hopper will result in operation of switch 49 and since this switch is directly connected in the lead to one side of the plug 101 the stage in question will become deenergized and no operation thereof can occur until the number of cards in the hopper of the succeeding stage is reduced and switch 49 again closes.

As has been previously indicated in the event that less than two printed circuit cards or plates are in position in the feed hopper 25 of a particular stage the stage will not operate because in this event the switch 34 will be open and therefore no cards will be fed from the hopper.

In forming printed circuits both sides of the base material are frequently utilized so that circuit components appear both on the obverse and the reverse of the card. As shown in Figure 1, the various units are arranged in a cascade fashion and the discharge chutes are so curved that the opposite sides of a card are presented to alternate ones of the cascaded stages thus enabling the testing and adjustment of resistors and capacitors on both sides of the card. By minor rearrangements the cascaded stages could be made operable on resistors and/or capacitors lying on the one side of the cards only.

Many other modifications of the apparatus described hereinabove may readily be made within the spirit of my invention. I wish therefore to be limited not by the foregoing specification, which is given for illustrative purposes only but, on the contrary, to be limited solely by the claims granted to me.

What is claimed is:

1. In a machine for automatically testing and adjusting printed circuit components to desired values, in combination, a magazine, a sensing station, means for feeding printed circuit units from said magazine to said station, means at said sensing station for establishing an electrical circuit through a particular one of said printed circuit components, means for comparing the value of the selected component with the value of a predetermined low limit value for such components and a predetermined high limit value for such components successively, means for discharging from the machine a printed circuit, the value of the tested component of which lies between said high limit and said low limit values, means for rejecting printed circuits the value of the tested component of which is greater than the said high limit value, and means energized when the value of said component is less than said low standard value to abrade away a portion of the selected component until the value thereof lies between said low and said high limit values, said discharge means being then energized to discharge the printed circuit from the machine.

2. In a machine for automatically testing and adjusting printed circuit resistors, in combination, a magazine, a sensing station, means for feeding printed circuit units from said magazine to said station, means at said sensing station for establishing an electrical circuit through a selected resistor on said unit, means for successively comparing the value of the selected resistor with the value of predetermined tolerance limit resistors of low and high limit value, means for discharging from the machine a printed circuit, the tested resistor of which has a value lying between the values of said tolerance limit resistors, means for ejecting from the machine along a path differing from the path of said discharge, a printed circuit value of the tested resistor of which is greater than that of the high tolerance limit resistor, means energized when the value of said tested resistor is less than said low tolerance limit value to abrade away a portion of the tested resistor until the value thereof lies between said low and said high tolerance limit values, and means for energizing said discharge means to discharge the printed circuit from the machine.

3. A device as claimed in claim 2, characterized in that said abrading means comprises a sandblasting device, said abrading means further comprising an electrically operated valve and a nozzle, said valve controlling the flow of sandblasting material to said nozzle.

4. A device as claimed in claim 3, characterized in that said nozzle is mounted on a pivoted arm adjacent said sensing station, said pivoted arm also carrying said circuit establishing means, and further characterized in that said pivoted arm is actuated by the piston of a pneumatic cylinder.

5. In a machine for automatically testing and adjusting printed circuit resistors, in combination, a magazine, a sensing station, a feed slide adapted to feed printed circuits from the bottom of a stack in said magazine to said sensing station, means at said sensing station for establishing an electrical circuit through a resistor forming a component of said printed circuit, a resistance bridge, means connecting said printed circuit resistor as the unknown arm of said resistance bridge, means for successively connecting a predetermined low tolerance limit resistor in shunt with a predetermined high tolerance limit resistor, and said predetermined high tolerance limit resistor alone as a second arm of said bridge, means for discharging a printed circuit from the machine when said tested resistor has a value between said high and low limit resistors, means for ejecting a printed circuit when said tested resistor has a value greater than the value of said high tolerance limit resistor, a relay connected across said resistance bridge and means activated by said relay when the value of said tested resistor is less than the value of said high and low limit tolerance resistors connected in parallel to abrade away a portion of said tested resistor to thereby increase its resistance value.

6. In a machine for automatically testing and adjusting printed circuit resistors, in combination, a sensing station, means for comparing a printed circuit resistor with a low limit resistance and a high limit resistance successively, said means comprising a comparison relay operated when the value of the printed circuit resistor is less than that of the particular limit resistance, means for connecting the printed circuit resistor while held at said sensing station with said comparison means, means for discharging a resistor when the value thereof is between the values of said high and low limit resistors, means for ejecting printed circuits from said sensing station when the value of the printed circuit resistor is greater than the value of said high limit resistor, means for abrading a printed circuit resistor when the value thereof is less than that of the said low limit resistance, a pair of control relays, each connected in a time delay circuit, the delay times being different, means for completing the time delay circuits of said relays when said sensing means connects said printed circuit resistor to said comparison means, means controlled by said comparison relay for opening the circuits of said control relays and preventing their operation when said comparison relay operates during the time delay period of one of said control relays, said means also energizing said abrading means, means operable by said one control relay for shifting from said low limit resistance to said high limit resistance, means for again completing the circuit to said other control relay upon operation of said one control relay, means operated by said comparison relay when operated during the time delay period of said other control relay for breaking the circuit to said other control relay and preventing the operation thereof, said last-mentioned means also causing energization of said discharge means, and means operated by said other control relay for energizing said ejecting means.

7. Means for feeding printed circuit units to a sensing station at which said units are automatically tested and adjusted, said feeding means comprising a magazine having a base and upstanding walls, a pair of opposite walls of said magazine being spaced from said base, a reciprocatory slide mounted to reciprocate between said base and said spaced side walls to thereby feed one printed circuit unit at a time from said magazine, a pneumatic cylinder having a piston rod, said piston rod being fixed to said reciprocatory slide, a solenoid valve in the supply line to said pneumatic cylinder, said valve being normally closed, means to energize said solenoid to feed a printed circuit unit from said magazine whenever the testing station is empty, and means interconnecting said magazine and the testing station to thereby guide a printed circuit unit fed from said magazine to position at said testing station.

8. A device as claimed in claim 7, characterized in that said magazine is adapted to hold said printed circuit units in horizontal position and said testing station holds said units in substantially vertical position and further characterized in that said guide means comprises a curved chute which joins said magazine with said testing station.

9. A device as claimed in claim 7, characterized in that a switching means is provided in said magazine, said means being arranged to open the circuit to said solenoid valve when the number of printed circuit units in the magazine is less than a predetermined number to thereby prevent feeding of units from said magazine.

10. In a machine for automatically testing and adjusting printed circuit resistors, in combination, a magazine, a sensing station, means for feeding printed circuit units from said magazine to said station, said station comprising a chute having stop pins thereacross arranged to locate the printed circuit unit in a particular position, a pivoted arm located adjacent said sensing station, contact making means located on said pivoted arm, said means being adapted to make contact with the ends of a selected printed circuit resistor of a printed circuit unit, said contact means being removably mounted on said pivoted arm, a nozzle removably mounted on said pivoted arm, said nozzle being adapted to direct a stream of abrasive material against said particular printed circuit resistor, and a plug-in unit connected to said contact means and removable therewith, said plug-in unit including tolerance limit resistors of low and high value, said unit being insertable in an electrical circuit to compare the value of the printed circuit resistor with said high and low tolerance limit resistor, said circuit including means for discharging from the sensing station printed circuits the tested resistor of which is between the high and low limits and for abrading those resistors which are below the low tolerance limit and thereafter discharging such resistors when their resistance value has been brought to a value between said low and high limit tolerance resistors.

11. A device as claimed in claim 10, characterized in that said pivoted arm is movable into sensing and abrading position by means of an electrically controlled pneumatically operated piston directly connected to said arm.

12. A device as claimed in claim 10, characterized in that said locating pins at said sensing station are directly connected to the piston of a pneumatic cylinder, and further characterized in that a solenoid valve connected to said cylinder controls the supply of pressure fluid thereto for withdrawing said locating pins.

13. In a machine for automatically testing and adjusting printed circuit resistors, in combination, a magazine, a sensing station, means for feeding printed circuit units from said magazine to said sensing station, a resistance bridge, a pivoted arm located adjacent said sensing station, electrically insulated contacts carried by said sensing arm, said contacts being adapted to engage a selected resistor on one of the printed circuit units, said contacts connecting said printed circuit resistor as the unknown arm of said resistance bridge, electro-pneumatic means for operating said pivoted arm to engage said contacts with a printed circuit resistor, circuit means for successively connecting a predetermined low tolerance limit resistor in shunt with a predetermined high tolerance limit resistor, and said predetermined high tolerance limit resistor alone as a second arm of said resistance bridge, means for discharging a printed circuit unit from the machine when the tested resistor thereof has a value between said high and low limit resistors, means for ejecting a printed circuit unit when the tested resistor has a value greater than the value of said high tolerance limit resistor, a nozzle mounted on said pivoted arm adjacent said contacts and in position to direct a stream of abrasive material on the tested resistor, means for causing a stream of abrasive material to be projected from said nozzle against the tested resistor when the tested value thereof is less than said low tolerance limit resistor and means for terminating the abrading action when the resistor reaches a value between said high and low limit tolerance resistor values.

References Cited in the file of this patent

UNITED STATES PATENTS

| | | |
|---|---|---|
| 1,826,992 | Carroll | Oct. 31, 1931 |
| 2,183,293 | Leach | Dec. 12, 1939 |
| 2,228,901 | Wilcox | Jan. 14, 1941 |
| 2,361,960 | Pelosi | Nov. 7, 1944 |
| 2,507,566 | Frisbie et al. | May 16, 1950 |
| 2,589,070 | Frisbie et al. | Mar. 11, 1952 |